(12) United States Patent
Kitashou (10) Patent No.: US 8,037,507 B2
(45) Date of Patent: Oct. 11, 2011

(54) VIDEO/AUDIO OUTPUT APPARATUS AND VIDEO/AUDIO OUTPUT METHOD

(75) Inventor: Tetsurou Kitashou, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 11/964,299

(22) Filed: Dec. 26, 2007

(65) Prior Publication Data

US 2008/0163329 A1    Jul. 3, 2008

(30) Foreign Application Priority Data

Dec. 27, 2006    (JP) ................. 2006-352803

(51) Int. Cl.
*H04N 7/173* (2006.01)
*G09G 5/00* (2006.01)

(52) U.S. Cl. ........ 725/100; 725/131; 725/139; 725/151; 345/676

(58) Field of Classification Search .......... None
See application file for complete search history.

(56) References Cited

U.S. PATENT DOCUMENTS

| | | | | |
|---|---|---|---|---|
| 5,583,980 | A  * | 12/1996 | Anderson | 345/473 |
| 6,789,105 | B2 * | 9/2004 | Ludwig et al. | 709/204 |
| 6,959,322 | B2 * | 10/2005 | Ludwig et al. | 709/204 |
| 2004/0056885 | A1 | 3/2004 | Azami | |

FOREIGN PATENT DOCUMENTS

| | | |
|---|---|---|
| CN | 1335013 A | 2/2002 |
| CN | 1494801 A | 5/2004 |
| JP | 05-019729 | 1/1993 |
| WO | 0041381 A | 7/2000 |

* cited by examiner

*Primary Examiner* — Hai Tran
*Assistant Examiner* — Fred Peng
(74) *Attorney, Agent, or Firm* — Canon U.S.A., Inc., IP Division

(57) ABSTRACT

A video/audio output apparatus comprises a control unit adapted to perform screen management of output video, and generate positional relationship information for each input video data; an extraction unit adapted to generate partial image data from the each input video data; an input unit adapted to input audio source differentiated audio data; and a tile generation unit adapted to configure tile data by compiling the partial image data generated by the extraction unit and the audio source differentiated audio data for each drawing region on a screen, based on the positional relationship information generated by the control unit.

13 Claims, 8 Drawing Sheets

FIG. 8

VIDEO/AUDIO OUTPUT APPARATUS AND VIDEO/AUDIO OUTPUT METHOD

BACKGROUND OF THE INVENTION

1. Field of the Invention

The present invention relates to a video/audio output apparatus, a video/audio output method, a computer program and a storage medium, and in particular to a preferred technique used for matching playback audio with playback video.

2. Description of the Related Art

In video/audio output apparatuses capable of simultaneous playback of plural pieces of video and audio data, part of one screen sometimes gets hidden by another screen. In such a case, the audio data for each screen needs to be composed using one method or another in order to output audio. Technology concerning apparatuses for performing such processing is disclosed in Japanese Patent Laid-Open No. 05-19729, for example.

The "image apparatus" disclosed in Japanese Patent Laid-Open No. 05-19729 refers to positional relationships including the size and overlap of images corresponding to input video signals or to the selection information of specific video. The audio signal synchronized with a large-size image, an image positioned in front of other images, or a selected specific image is set as a standard value, and processing is then automatically performed to reduce the amplitude of audio signals synchronized with other images.

This technology enables sound volume control of audio data corresponding to each screen to be performed automatically based on the configuration of the screen when simultaneously outputting a plurality screens. However, this technology is only for controlling the sound volume of audio data corresponding to each screen, and does not enable audio management of individual objects on each screen.

Figure 3:
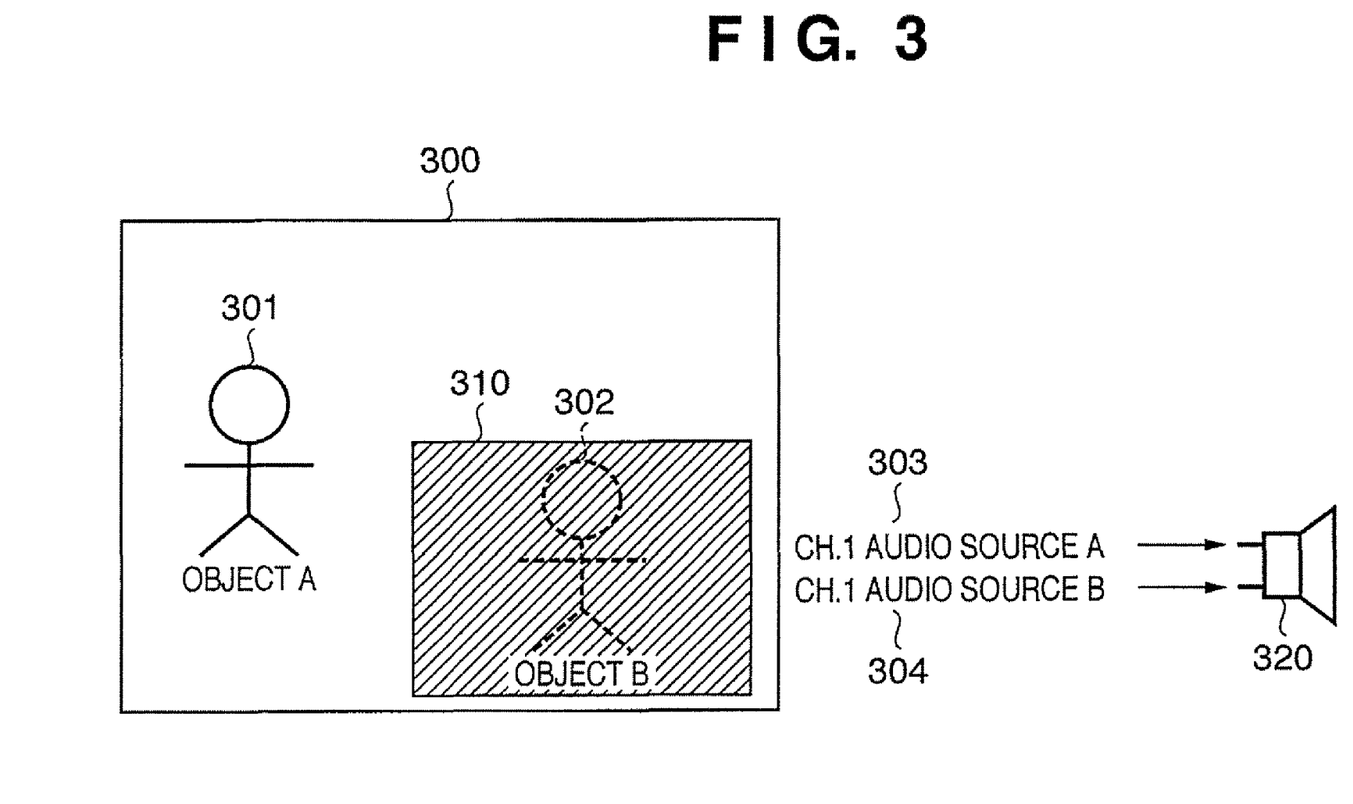
FIG. 3 shows the effect when a video/audio output apparatus of preferred embodiments is not applied.

Thus, there are cases in which two objects A and B exist on a CH.1 screen, and a CH.2 screen newly overlaps the object B, such as shown in FIG. 3, for example. In such a case, audio management of individual objects is not possible with technology using a conventional method.

Consequently, there are disadvantageous times when an audio source B corresponding to the object B hidden by CH.2 and not displayed, as shown in FIG. 3, is actually output. Conventional technology thus does not enable output audio to be matched with the configuration of output video after a plurality of screens have been composed in a video/audio output apparatus that simultaneously outputs a plurality of screens.

SUMMARY OF THE INVENTION

The present invention was made in consideration of the above problem, and has as its object to enable output audio to be matched with the configuration of output video after a plurality of screens have been composed.

According to one aspect of the present invention, a video/audio output apparatus comprises:

a control unit adapted to perform screen management of output video, and generate positional relationship information for each input video data;

an extraction unit adapted to generate partial image data from the each input video data;

an input unit adapted to input audio source differentiated audio data; and a tile generation unit adapted to configure tile data by compiling the partial image data generated by the extraction unit and the audio source differentiated audio data for each drawing region on a screen, based on the positional relationship information generated by the control unit.

According to another aspect of the present invention, a video/audio output method comprises:

a control step of performing screen management of output video, and generating positional relationship information for each input video data;

an extraction step of generating partial image data from the each input video data;

an input step of inputting audio source differentiated audio data; and a tile generation step of configuring tile data by compiling the partial image data generated in the extraction step and the audio source differentiated audio data for each drawing region on a screen, based on the positional relationship information generated in the control step.

Further features of the present invention will become apparent from the following description of exemplary embodiments, with reference to the attached drawings.

DESCRIPTION OF THE EMBODIMENTS

First Embodiment

Hereinafter, embodiments of the present invention will be described in detail with reference to the accompanying drawings.

Figure 6:
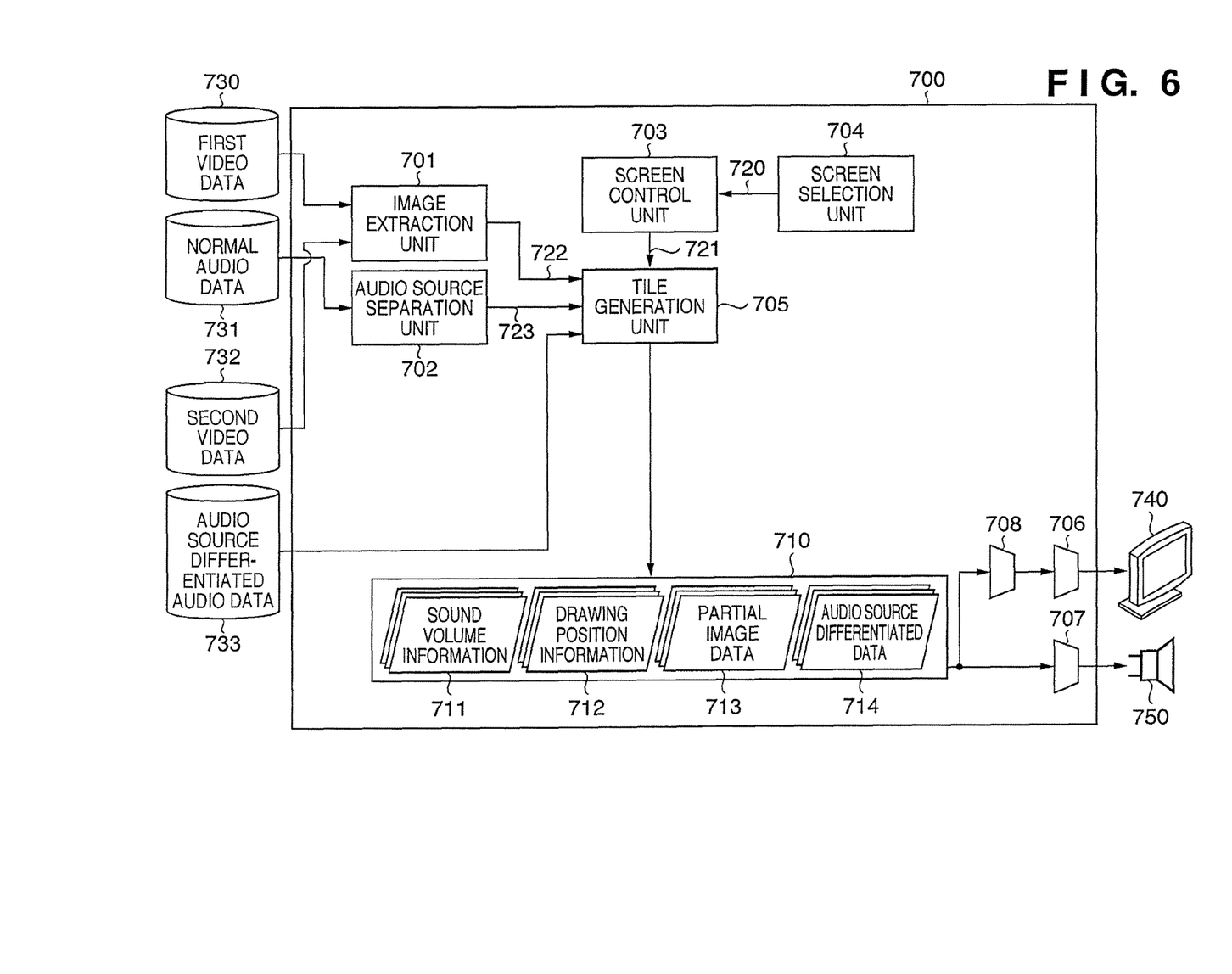
FIG. 6 is a block diagram showing an exemplary configuration of the video/audio output apparatus according to a first embodiment.

FIG. 6 is a block diagram showing a first embodiment of the present invention. As shown in FIG. 6, a video/audio output apparatus 700 outputs video data 730 and 732 of a plurality of input streams and audio data (normal audio data) 731 synchronized with the video data as a single video stream to a video output unit 740. The video/audio output apparatus 700 also composes and outputs audio data to an audio output unit 750.

In this example, the input audio is assumed to consist of normal audio data 731 to be synchronized with video data 730 (first video data) and 732 (second video data), and audio source differentiated audio data 733 in which the audio sources are separated for each object in the video data.

Firstly, the video data 730 and 732 are input to an image extraction unit 701. The image extraction unit 701 divides each frame of the video data 730 and 732 into arbitrary sized blocks, and outputs the blocks as partial image data 722.

The normal audio data 731 is input to an audio source separation unit 702. The audio source separation unit 702, in addition to separating the audio data for each audio source included in the input audio data, specifies the coordinates of the audio sources on the screen and outputs the audio source differentiated audio data in association the audio source coordinate information as audio source differentiated data 723.

While audio source separation and coordinate specification may be performed using an analysis method that employs object recognition, a simple method can be employed that involves separating the left and right stereo output as two pieces of audio source differentiated audio data, and setting the coordinates thereof as the arbitrary coordinates of the left and right halves of the screen. Note that audio source differentiated audio data 733, which has already been separated into audio source differentiated data, is not input to the audio source separation unit 702 when input to the video/audio output apparatus 700.

A screen control unit 703, which manages the screen configuration of video data in the output image, generates screen positional relationship information 721 that includes the output position and vertical positional relationship of each screen (input video), and the type of composition processing, such as opaque composition/translucent composition or the like, and outputs the generated screen positional relationship information 721 to a tile generation unit 705. The screen positional relationship information 721 shows the final configuration of the output screen.

The tile generation unit 705 receives as input the partial image data 722, the audio source differentiated audio data 723 and the screen positional relationship information 721, which are output by the above described units, and the audio source differentiated audio data 733, which had already been separated as audio source differentiated data when input to the video/audio output apparatus 700. The tile generation unit 705 generates and outputs this data as tile data 710, which is a data unit, for each drawing region on each screen. That is, the tile generation unit 705 configures tile data by compiling the partial image data 722 and the audio source differentiated data 723 and the audio source differentiated audio data 733 for each drawing region on the screen, based on the screen positional relationship information 721.

Figure 4:
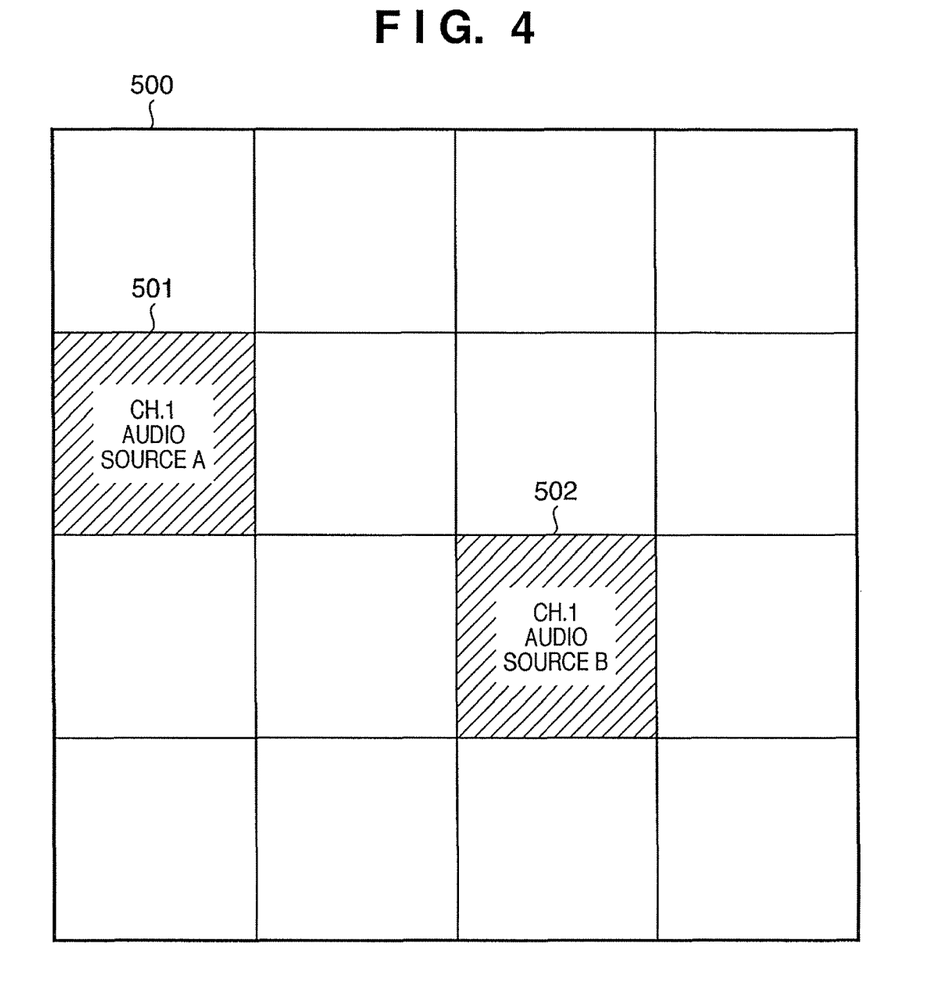
FIG. 4 shows the relationship between drawing position information, partial image data, and audio source differentiated data in tile data of preferred embodiments.

The case where two audio sources are included in the single frame of output image data 500, as shown in FIG. 4, will be described as an example. In the case of FIG. 4, the audio sources A and B are included in CH.1, and the audio source coordinates thereof correspond respectively to first partial image data 501 and second partial image data 502.

In such a case, the first partial image data 501, the CH.1 audio source A, and the drawing position information of the first partial image data 501 form one piece of tile data. Similarly, the second partial image data 502, the CH.1 audio source B, and the drawing position information of the second partial image data 502 form one piece of tile data. Since audio source differentiated data corresponding to other portions does not exist, the tile data for these portions is configured by only partial image data and drawing position information.

Figure 5:
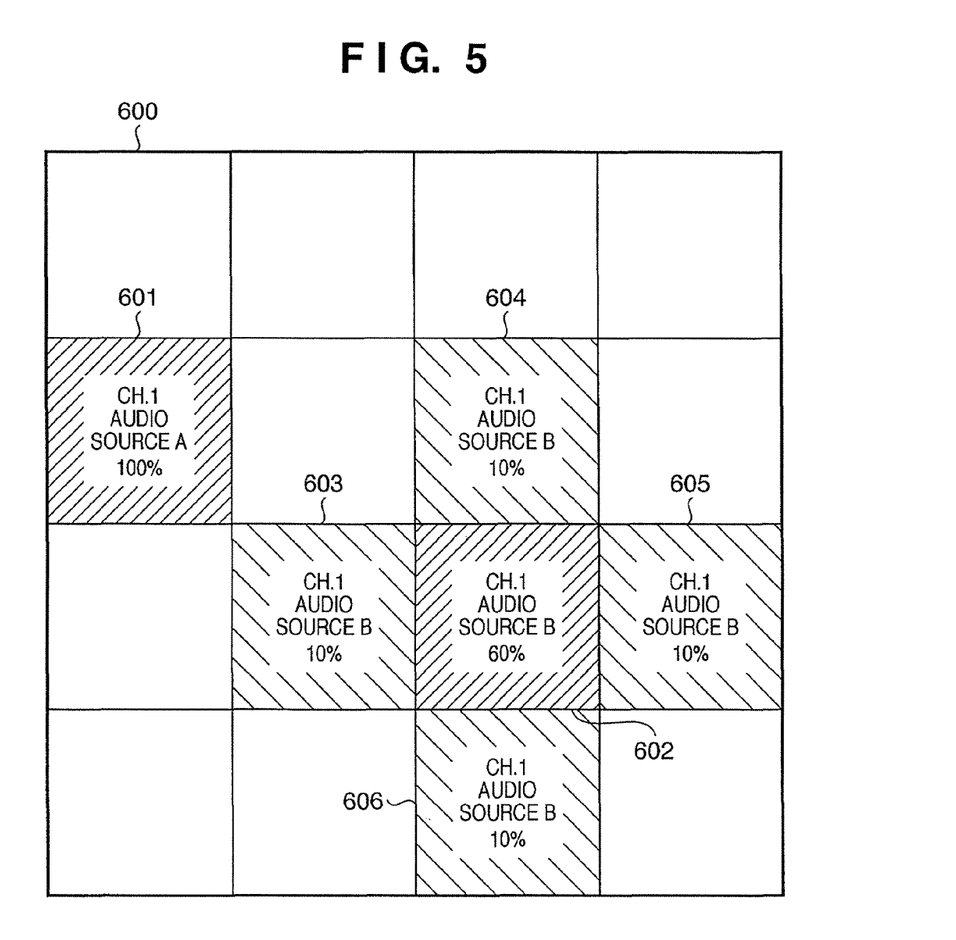
FIG. 5 shows the relationship between drawing position information, partial image data, audio source differentiated data, and sound volume information in tile data of preferred embodiments.

In the case where the tile data includes sound volume information, as shown in the example in FIG. 5, partial image data 601 to 606 forms tile data having partial image data, drawing position information, audio source differentiated data, and sound volume information. The tile data for other portions is configured by only partial image data and drawing position information.

Tile data 710 thus configured is input to an image processing unit 708. The image processing unit 708 outputs tile data after performing processing on each piece of input tile data to improve the picture quality and the like of the partial image data 713, and update the partial image data 713.

Tile data output from the image processing unit 708 is input to a screen composition unit 706. The screen composition unit 706 disposes the partial image data 713 with reference to the drawing position information 712 of the plural pieces of input tile data, and outputs output screen data.

The output screen data (output video) output from the screen composition unit 706 is input to the video output unit 740. The video output unit 740 outputs on an arbitrary display the inputted output screen data. As a result, a plurality of inputted video streams are output as a single video stream in the video output unit 740.

In relation to audio output, on the other hand, an audio composition unit 707 receives the tile data as inputs, and composes audio with reference to the audio source differentiated data 714 and the sound volume information 711 in the tile data. Specifically, the audio composition unit 707 composes the audio source differentiated data 714 included in the tile data by a ratio of the sound volume information 711, and generates one screen of output audio for each channel of the audio output unit 750. That is, the audio composition unit 707 functions as an audio data generation unit that generates audio data which includes a proportion of the audio source differentiated data relative to the overall sound volume as sound volume information.

Since the tile generation unit 705 only adds audio source differentiated data 714 and sound volume information 711 to tile data 710 whose audio is to be output, the output audio data is composed only for audio source differentiated data 714 to be output. The audio source differentiated data 714 to be output here is audio source differentiated data 714 that corresponds to the partial image data 713 displayed on the output image data 500, for example.

Further, a screen selection unit 704 provides a user interface that enables the user to select either an arbitrary range on an output screen or a screen, and inputs the specified screen information to the screen control unit 703 as screen control information 720. The screen control information 720 thus inputted makes it possible for the user to change the screen configuration as a result, by changing the screen configuration managed by the screen control unit 703.

As described above, the compatibility of output image data 500 in the video output unit 740 and output audio data in the audio output unit 750 can be achieved in a video/audio output apparatus that receives as input a plurality of video streams and a plurality of audio streams corresponding to video streams. Output audio data can thus be matched with output image data.

Second Embodiment

Figure 7:
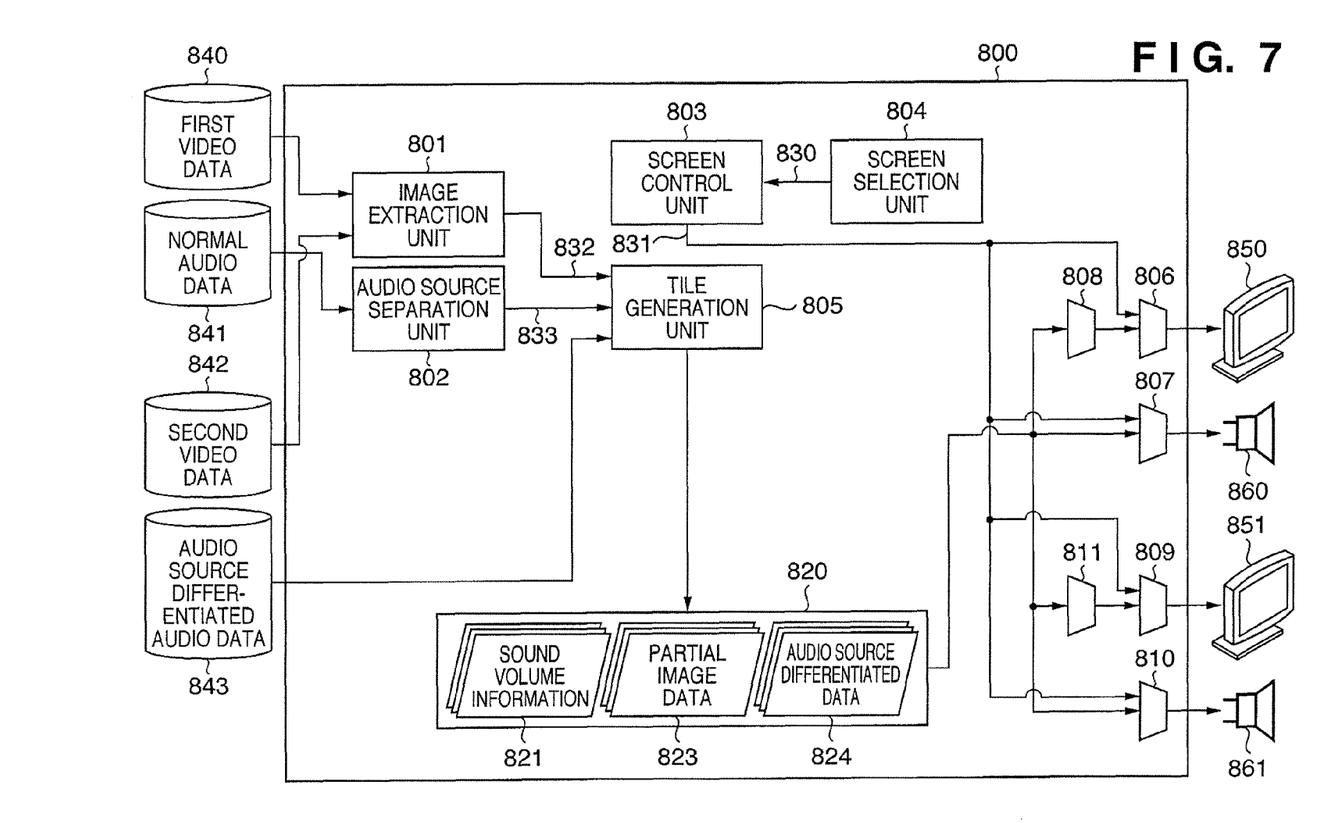
FIG. 7 is a block diagram showing an exemplary configuration of the video/audio output apparatus according to a second embodiment.

FIG. 7 is a block diagram showing an exemplary configuration of a second embodiment of the present invention. Similar to the video/audio output apparatus 700 according to the first embodiment, video/audio output apparatus 800 according to this embodiment comprises an image extraction unit 801 (which inputs first video data 840 and second video data 842, and outputs partial image data 832), an audio source separation unit 802 (which inputs normal audio data 841, and outputs audio source differentiated data 833), a screen control unit 803, a screen selection unit 804, and a tile generation unit 805 (which inputs the partial image data 832, the audio source differentiated data 833, and audio source differentiated audio data 843). This configuration differs from the first embodiment shown in FIG. 6 in that a plurality of video output units 850 and 851 and a plurality of audio output units 860 and 861 are included. Further, this configuration comprises a plurality of image processing units 808 and 811. Note that in the present embodiment, the respective screen configurations of a first video output unit 850 and a second video output unit 851 are assumed to be independent.

In the present embodiment, the screen control unit 803 performs screen management for both the first video output unit 850 and the second video output unit 851 based on screen control information 830 from the screen selection unit 804. The screen control unit 803 inputs screen positional relationship information 831 to a first screen composition unit 806, a first audio composition unit 807, a second screen composition unit 809, and a second audio composition unit 810. Thus, in the present embodiment, drawing position information is not included in tile data 820, unlike the first embodiment.

The first screen composition unit 806 and the second screen composition unit 809 compose, in specified positional relationships, video streams to be played in the video output units, with reference to the screen positional relationship information 831 respectively input from the screen control unit 803 and the tile data 820 (including sound volume information 821, partial image data 823, and/or audio source differentiated data 824) via first image processing unit 808 and second image processing unit 811 respectively, and output the composed video streams.

Similarly, the first audio composition unit 807 and the second audio composition unit 810 select and compose audio streams to be played in the audio output units, with reference to the screen positional relationship information 831 respectively input from the screen control unit 803, and output the composed audio streams.

Therefore, even if there are a plurality of video output units and audio output units with independent screen configurations, it is possible to match the video and audio output of the video output units and audio output units.

Figure 1:
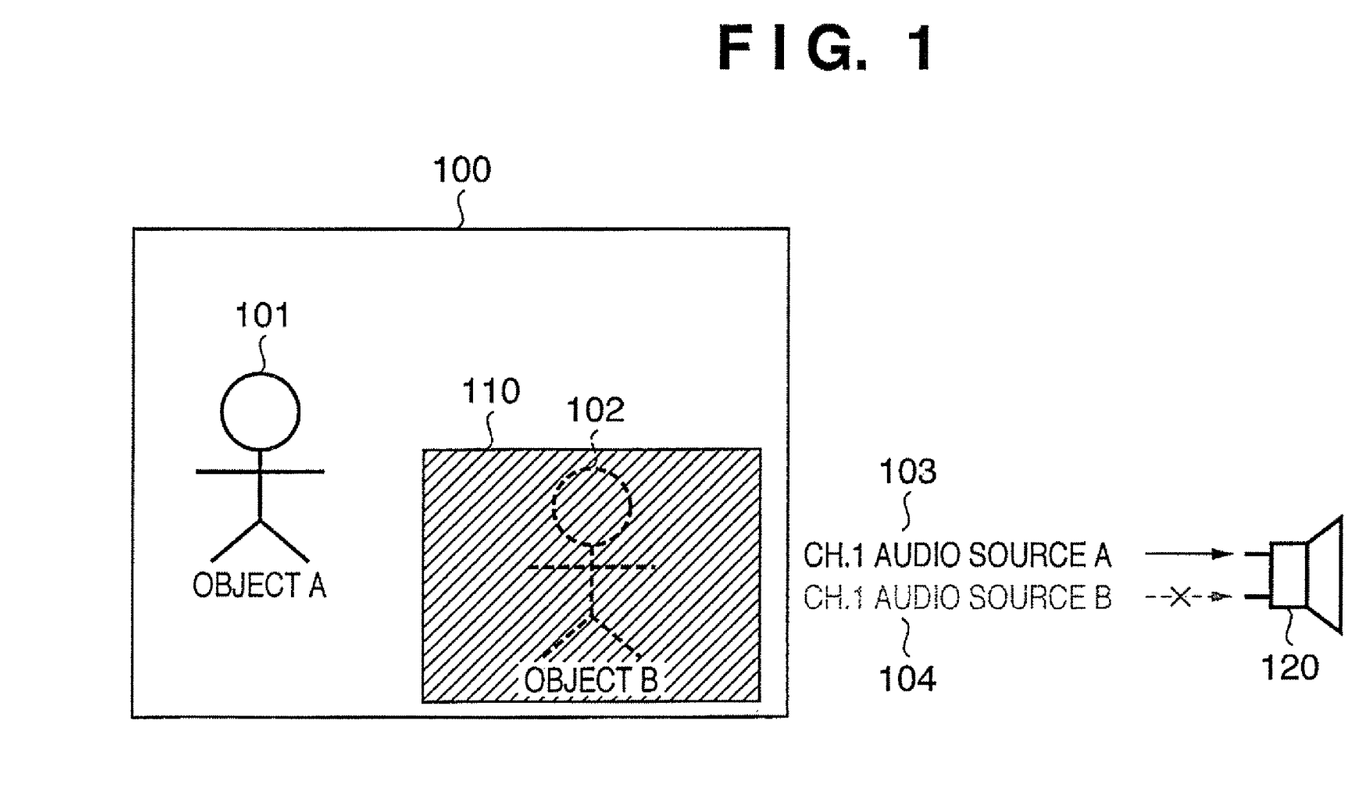
FIG. 1 shows a specific example of a typical effect of preferred embodiments.

FIG. 1 shows a typical effect of the present embodiment. Two screens CH.1 100 and CH.2 110 are output on a single video output unit, with an object A 101 and an object B 102 existing on CH.1.

Thus, FIG. 1 shows that in the case where the object B 102 of the CH.1 100 is hidden by the CH.2 110, only the CH.1 audio source A 103 corresponding to the object A 101 is output and the CH.1 audio source B 104 corresponding to the object B 102 is erased from the output audio of an audio output unit 120. Note that a case where there is no audio source corresponding to the CH.2 110 is shown in this example for simplification.

Figure 2:
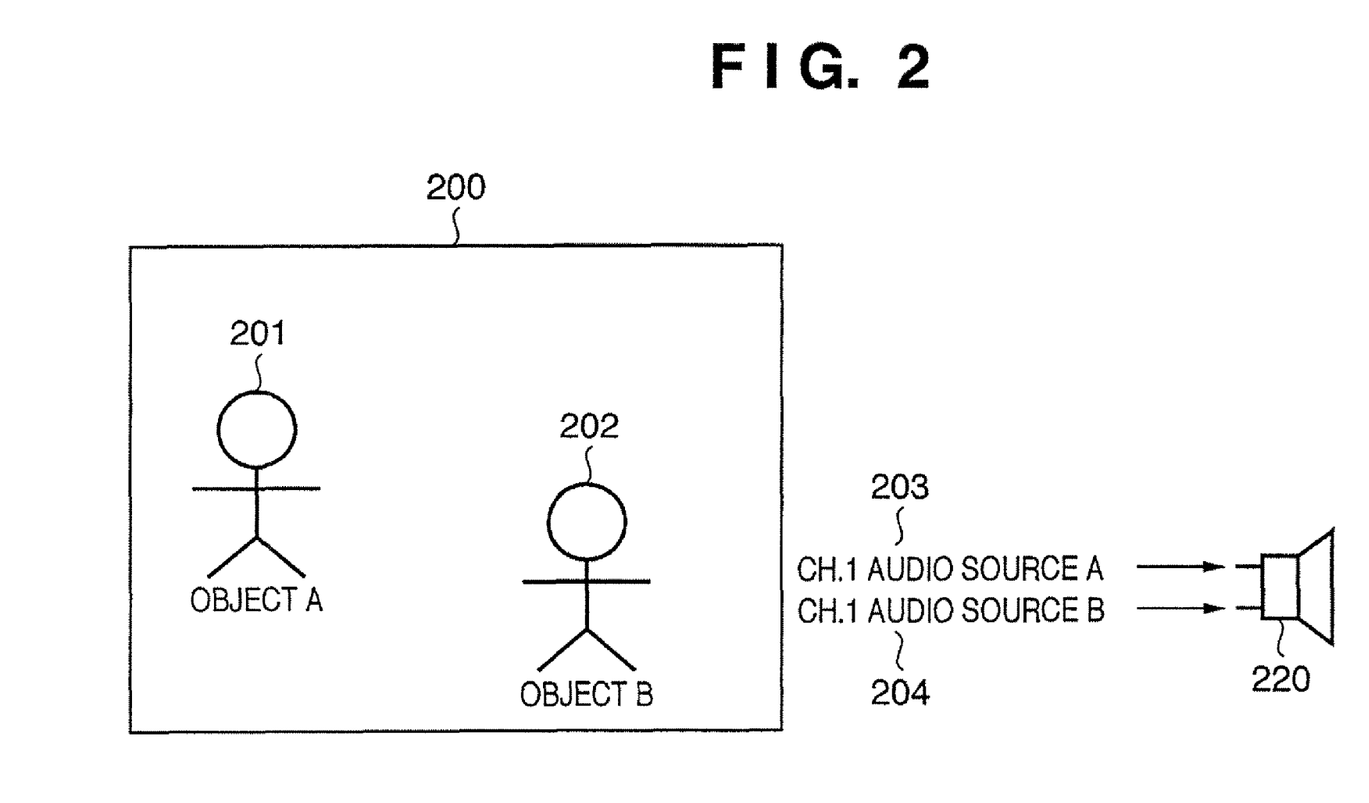
FIG. 2 shows an exemplary operation in a common display.

FIG. 2 shows a general use case of a display. A single screen CH.1 200 is output on a signal video output unit, with an object A 201 and an object B 202 existing on the CH.1 200.

FIG. 2 shows that, in this case, a CH.1 audio source A 203 and a CH.1 audio source B 204 corresponding respectively to the object A 201 and the object B 202 are output from the output audio of an audio output unit 220. In such a case, the output audio is the same for both the prior art and the present invention, since audio data corresponding to the CH.1 200 is output.

FIG. 3 shows the effect when the video/audio output apparatus of the present invention is not applied. In this case, two screens CH.1 300 and CH.2 310 are output on a single video output unit, with an object A 301 and an object B 302 existing on the CH.1 300, and the object B 302 of the CH.1 300 being hidden by the CH.2 310.

In such a case, conventional technology only enables audio data corresponding to the CH.1 300 to be controlled together, and does not enable audio management to be performed for each object. Thus, not only audio data corresponding to the object A 301 (that is, CH. 1 audio source A 303) but also audio data corresponding to the object B 302 (that is, CH. 1 audio source B 304) would be output from the output audio of an audio output unit 320 despite the object B 302 being hidden by the CH.2 310.

Also, audio data corresponding to the object A 301 may sometimes not be output despite the object A 301 appearing on the output screen. In either case, it is possible that the output image and the output audio may not be matched.

FIG. 4 shows the relationship between drawing position information, partial image data, and audio source differentiated data in the tile data of the present embodiment. In this example, output image data 500 is divided into 16 blocks, with the CH.1 audio source A being corresponded to first partial image data 501 and the CH.1 audio source B being similarly corresponded to second partial image data 502.

FIG. 5 shows the relationship between sound volume information, drawing position information, partial image data, and audio source differentiated data in the tile data of the present embodiment. In this example, output image data 600 is divided into 16 blocks, with the CH.1 audio source A being corresponded to partial image data 601 at a sound volume of 100%.

Similarly, the CH.1 audio source B is corresponded to partial image data 602 at a sound volume of 60%. Similarly, the CH.1 audio source B is corresponded to partial image data 603 to 606 at respective sound volumes of 10%. Thus, even in the case where audio sources are positioned over a wide area on the output screen, the distribution of the audio sources can be represented by adding sound volume information.

Third Embodiment

Figure 8:
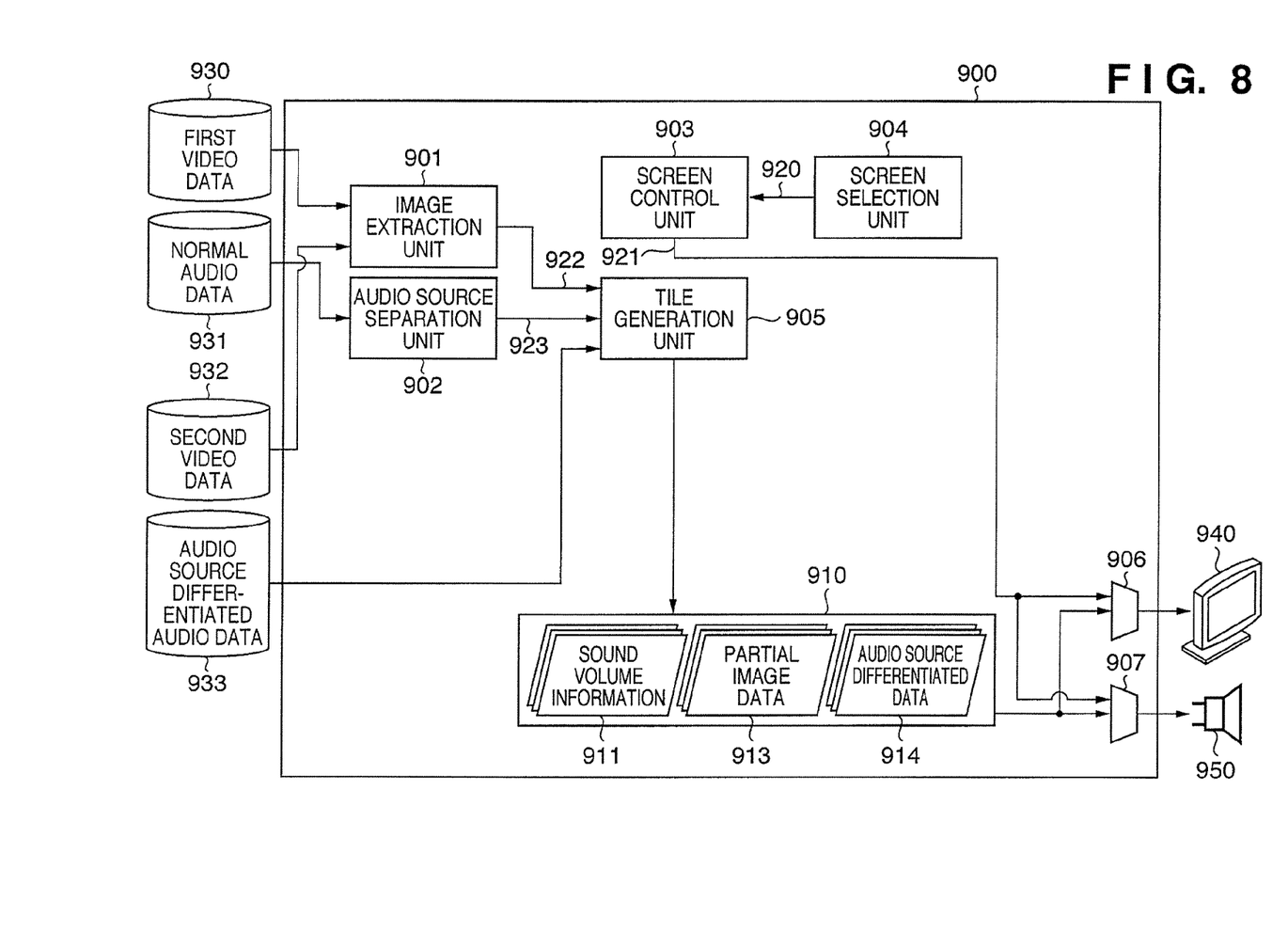
FIG. 8 is a block diagram showing an exemplary configuration of the video/audio output apparatus according to a third embodiment.

A third embodiment of the present invention will be described next with reference to FIG. 8.

Similar to the video/audio output apparatus 700 according to the first embodiment, video audio output apparatus 900 according to this embodiment comprises an image extraction unit 901 (which inputs first video data 930 and second video data 932, and outputs partial image data 922), an audio source separation unit 902 (which inputs normal audio data 931, and outputs audio source differentiated data 923), a screen control unit 903 (which inputs screen control information 920), a screen selection unit 904, a tile generation unit 905 (which inputs the partial image data 922, the audio source differentiated data 923, and audio source differentiated audio data 933, and outputs tile data including sound volume information 911, partial image data 913, and/or audio source differentiated data 914), screen composition unit 906, and audio composition unit 907. In FIG. 8, the screen control unit 903 outputs screen positional relationship information 921 to the screen composition unit 906 and the audio composition unit 907. The selection of partial image data 913 to be drawn and audio source differentiated data 914 to be played is performed respectively by the screen composition unit 906 (which outputs a composed screen to a video output unit 940) and the audio composition unit 907 (which outputs a composed audio to a audio output unit 950). Since the specific functions and operations are similar to the first and second embodiments, a detailed description thereof will be omitted.

Additional Embodiments of the Present Invention

Although embodiments of the present invention have been described in detail above, it is possible for the invention to take on the form of a system, apparatus, computer program or storage medium. More specifically, the present invention may be applied to a system comprising a plurality of devices or to an apparatus comprising a single device.

It should be noted that there are cases where the object of the invention is attained also by supplying a program, which implements the functions of the foregoing embodiments, directly or remotely to a system or apparatus, reading the supplied program codes with a computer of the system or apparatus, and then executing the program codes.

Accordingly, since the functions of the present invention are implemented by computer, the program codes per se installed in the computer also fall within the technical scope of the present invention. In other words, the present invention also covers the computer program itself that is for the purpose of implementing the functions of the present invention.

In this case, so long as the system or apparatus has the functions of the program, the form of the program, e.g., object code, a program executed by an interpreter or script data supplied to an operating system, etc., does not matter.

Examples of storage media that can be used for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program per se of the present invention or a compressed file that contains an automatic installation function can be downloaded to a recording medium such as a hard disk. Further, the program of the present invention can be supplied by dividing the program code constituting the program into a plurality of files and downloading the files from different websites. In other words, a WWW server that downloads, to multiple users, the program files that implement the functions of the present invention by computer also is covered by the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer. Further, besides the case where the aforesaid functions according to the embodiment are implemented by executing the read program by computer, an operating system or the like running on the computer may perform all or a part of the actual processing so that the functions of the foregoing embodiment can be implemented by this processing.

Furthermore, after the program read from the storage medium is written to a memory provided in a function expansion board inserted into the computer or a function expansion unit connected to the computer, a CPU or the like mounted on the function expansion board or function expansion unit performs all or a part of the actual processing so that the functions of the foregoing embodiment can be implemented by this processing.

Thus, in accordance with the present invention, as described above, it is possible to provide a technique through which the confidentiality of print data can be maintained even under such circumstances as interruption of power.

As described above, tile data in which the output audio is matched with the audio source object displayed on the output screen can be configured according to the present invention. In particular, output audio can be matched with the configuration of output video after a plurality of screens have been composed in a video/audio output apparatus that simultaneously outputs a plurality of screens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-352803, filed Dec. 27, 2006, which is hereby incorporated by reference herein in its entirety.

What is claimed is:

1. A video/audio output apparatus comprising:
    a control unit adapted to perform screen management of output video, and generate positional relationship information for each input video data;
    an extraction unit adapted to extract partial image data from the each input video data;
    a tile generation unit adapted to configure tile data by compiling the partial image data extracted by the extraction unit and an audio source differentiated audio data for each drawing region on a screen, based on the positional relationship information generated by the control unit,
    wherein the tile data configured by the tile generation unit includes a proportion of the audio source differentiated audio data relative to an overall sound volume as sound volume information; and
    an input unit of the tile generation unit adapted to input the audio source differentiated audio data.

2. The video/audio output apparatus according to claim 1, wherein the control unit generates screen positional relationship information showing a final configuration of a screen to be output, and supplies the generated information to the tile generation unit.

3. The video/audio output apparatus according to claim 1, further comprising:
    a screen composition unit adapted to configure one piece of screen data by composing the tile data configured by the tile generation unit;
    an output unit adapted to display the screen data configured by the screen composition unit on a display device; and
    an audio data composition unit adapted to generate audio data for one screen by composing the audio source differentiated audio data in the tile data configured by the tile generation unit,
    wherein the control unit generates screen positional relationship information showing a final configuration of a screen to be output, and supplies the generated screen positional relationship information to the screen composition unit and the audio data composition unit.

4. The video/audio output apparatus according to claim 1, further comprising a selection unit adapted to cause a user to select a tile to be output to a display device, from the tile data configured by the tile generation unit.

5. A video/audio output method comprising:
    a control step of performing screen management of output video, and generating positional relationship information for each input video data;
    an extraction step of extracting partial image data from the each input video data;
    an input step of inputting audio source differentiated audio data; and
    a tile generation step of configuring tile data by compiling the partial image data extracted in the extraction step and the audio source differentiated audio data for each drawing region on a screen, based on the positional relationship information generated in the control step,
wherein the tile data configured in the tile generation step includes a proportion of the audio source differentiated audio data relative to an overall sound volume as sound volume information.

6. The video/audio output method according to claim 5, wherein in the control step, screen positional relationship information showing a final configuration of a screen to be output is generated and supplied to the tile generation step.

7. The video/audio output method according to claim 5, further comprising:
   a screen composition step of configuring one piece of screen data by composing the tile data configured in the tile generation step;
   an output step of displaying the screen data configured in the screen composition step on a display device; and
   an audio data composition step of generating audio data for one screen by composing the audio source differentiated audio data in the tile data configured in the tile generation step,
   wherein in the control step, screen positional relationship information showing a final configuration of a screen to be output is generated and supplied to the screen composition step and the audio data composition step.

8. The video/audio output method according to claim 5, further comprising a selection step of causing a user to select a tile to be output to a display device, from the tile data configured in the tile generation step.

9. A computer-executable program of instructions, stored on a non-transitory storage medium, for causing a computer to perform a method comprising:
   a control step of performing screen management of output video, and generating positional relationship information for each input video data;
   an extraction step of extracting partial image data from the each input video data;
   an input step of inputting audio source differentiated audio data; and a tile generation step of configuring tile data by compiling the partial image data extracted in the extraction step and the audio source differentiated audio data for each drawing region on a screen, based on the positional relationship information generated in the control step~
   wherein the tile data configured in the tile generation step includes a proportion of the audio source differentiated audio data relative to an overall sound volume as sound volume information.

10. A non-transitory computer-readable storage medium storing a computer-executable program as claimed in claim 9.

11. The computer-executable program of instructions, stored on a non-transitory storage medium according to claim 9, wherein in the control step, screen positional relationship information showing a final configuration of a screen to be output is generated and supplied to the tile generation step.

12. The computer-executable program of instructions, stored on a non-transitory storage medium according to claim 9, further comprising:
   a screen composition step of configuring one piece of screen data by composing the tile data configured in the tile generation step;
   an output step of displaying the screen data configured in the screen composition step on a display device; and
   an audio data composition step of generating audio data for one screen by composing the audio source differentiated audio data in the tile data configured in the tile generation step,
   wherein in the control step, screen positional relationship information showing a final configuration of a screen to be output is generated and supplied to the screen composition step and the audio data composition step.

13. The computer-executable program of instructions, stored on a non-transitory storage medium according to claim 9, further comprising a selection step of causing a user to select a tile to be output to a display device, from the tile data configured in the tile generation step.

* * * * *